ROTATIONAL SHAFT ENCODER HAVING PROVISIONS FOR PHASE ADJUSTMENT OF CONTACTS DURING OPERATION

Filed May 4, 1965

INVENTOR.
DAVID H. MARGOLIEN
ARNOLD ST. J. LEE
NIELS KRAG
Frederic P. Smith
ATTORNEY INVENTOR.
DAVID H. MARGOLIEN
ARNOLD ST. J. LEE
NIELS KRAG
Frederic P. Smith
ATTORNEY United States Patent Office 3,444,549

Patented May 13, 1969

3,444,549

ROTATIONAL SHAFT ENCODER HAVING PROVISIONS FOR PHASE ADJUSTMENT OF CONTACTS DURING OPERATION

David H. Margolien, Los Angeles, Calif., Arnold St. J. Lee, Fort Lee, N.J., and Niels Krag, Los Angeles, Calif., assignors to Litton Precision Products, Inc., Beverly Hills, Calif.

Filed May 4, 1965, Ser. No. 453,065

Int. Cl. H04l *3/00;* H03k *13/00;* G08c *9/00*

U.S. Cl. 340—347 9 Claims

ABSTRACT OF THE DISCLOSURE

Disclosed is a rotational shaft encoder of the double disc type having an epicyclic gear train between the two discs, coaxial input and output shafts which are axially restrained by the discs and a segmented transmission housing with two portions each having a brush block corresponding to one of the discs fixedly mounted therein, the portions being rotatably adjustable relative each other.

Figure 1:
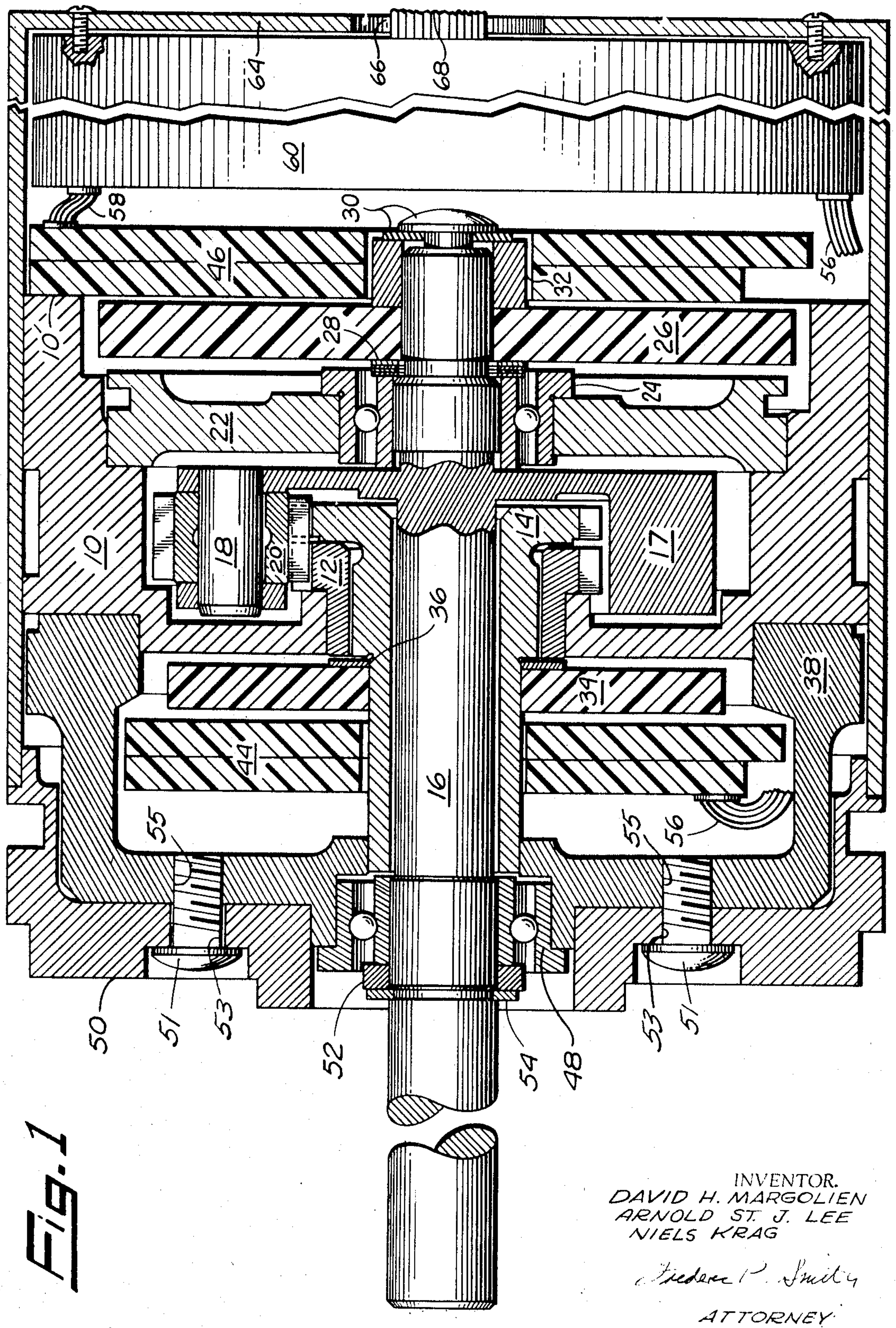

The present invention relates in general to an analog to digital converter and in particular to a rotational shaft encoder employing an improved transmission for converting the shaft position into a digital number representative of the shaft position.

In the prior art, a number of different schemes have been devised for converting analog signals to digital form. Most of the schemes can be characterized as being one of two major types depending on whether a physical analog signal, such as a shaft rotation, is used or whether an electrical analog signal, such as a voltage, is used. It is well known to those skilled in the art, however, that an analog signal in the form of a shaft rotation can be transformed to a digital form at a higher rate of speed than can an analog signal in the form of an electrical voltage. Furthermore, a higher degree of accuracy can be achieved when transforming a shaft rotation to a digital form than when transforming an electrical voltage to a digital form. Hence, it is desirable in most applications to utilize a shaft rotation rather than an electrical voltage as the analog signal.

As is well known, an analog signal in the form of a shaft rotation can be converted to a digital form by means of a rotational shaft encoder. Basically, the encoder includes a rotating encoder disc having a separate annular track for each binary digit of the digital number to be represented. Each annular track in turn consists of separate segments or areas which are representative of the value of the binary digit represented by the particular annular track. In the majority of encoders, the areas comprising the annular rings are either electrically conductive or non-conductive; thus when a contact brush is placed in contact with one of the annular rings on the encoder disc, an electrical current flows through the brush whenever a conductive area passes under the brush. In this manner, the value of each digit of the binary number which is representative of the shaft position can be determined and, by connecting an electrical conductor to each of the brushes, the binary number can be applied to a digital computer or other apparatus.

Since there must be a separate annular ring for each binary digit of the number to be converted into digital form, a large number of rings would be required on an encoder disc which is utilized for generating a digital number of large magnitude or high accuracy. It has been found, however, that the small dimensional tolerances allowable in the manufacture of an encoder disc make it extremely difficult to manufacture a reasonably sized disc having a large number of annular rings. In order to avoid this manufacturing problem, analog to digital converters have been mechanized which utilize two encoder discs which move through angular amounts in a preselected ratio in response to the same input shaft rotation and thus, in effect, carry the count from one disc to the other when it reaches a selected magnitude.

It is evident that some type of reduction gearing is necessary to accomplish this result. A particular example of a planetary differential gear train used in a rotational shaft encoder is described in U.S. Patent No. 3,054,098, issued Sept. 11, 1962, and assigned to the same assignee as the present application. Although this gear train (or transmission) has performed satisfactorily, it has been found necessary to overcome many of the disadvantages of it and other prior art encoders in order to keep up with the demands of modern technology. In general, these demands have been directed towards more compactness, greater ease of assembly, and improved bearing support of all moving parts so as to increase the life of the device. In particular, it has been found desirable that there be no imbalances in the planetary gear assembly and as little axial play in the input and output shafts as possible. In addition, the prior art devices provided no means by which the contact brush blocks of the high speed and low speed encoder discs could be rotated with respect to one another while the encoder was in a dynamic condition so as to provide proper phasing of the electrical outputs of the high speed and low speed encoder discs.

The present invention has succeeded in meeting the demands of the technology in overcoming all of the above-mentioned disadvantages by providing an improved rotational shaft encoder in which the input shaft carries the high speed encoder disc and drives a balanced coaxial, epicyclic gear train, the output shaft of which carries the low speed encoder disc. The high speed encoder disc and the low speed encoder disc are positioned to axially secure the input shaft and the output shaft, respectively. In addition, the high speed and low speed brush blocks are mounted on a segmented rotatable transmission housing which enables them to be dynamically phased.

It is therefore the primary object of the present invention to provide a new and improved rotational shaft encoder.

It is another object of the present invention to provide a shaft encoder having new and improved transmission.

It is a further object of the present invention to provide a shaft encoder in which the positions of the input and output shafts are axially secured.

It is still another object of the present invention to provide a shaft encoder having a minimal length.

It is a further object of the present invention to provide a rotational shaft encoder in which the electrical phasing between the output signals from the high speed and low speed brush blocks can be simply adjusted while the encoder is in a dynamic condition.

The novel features which are believed to be characteristic of the invention, both as to its organization and method of operation, together with further objects and advantages thereof, will be better understood from the following description considered in connection with the accompanying drawings. It is to be expressly understood, however, that the drawings are for purposes of illustration and description only and are not intended as a definition of the limits of the invention.

Figure 2:
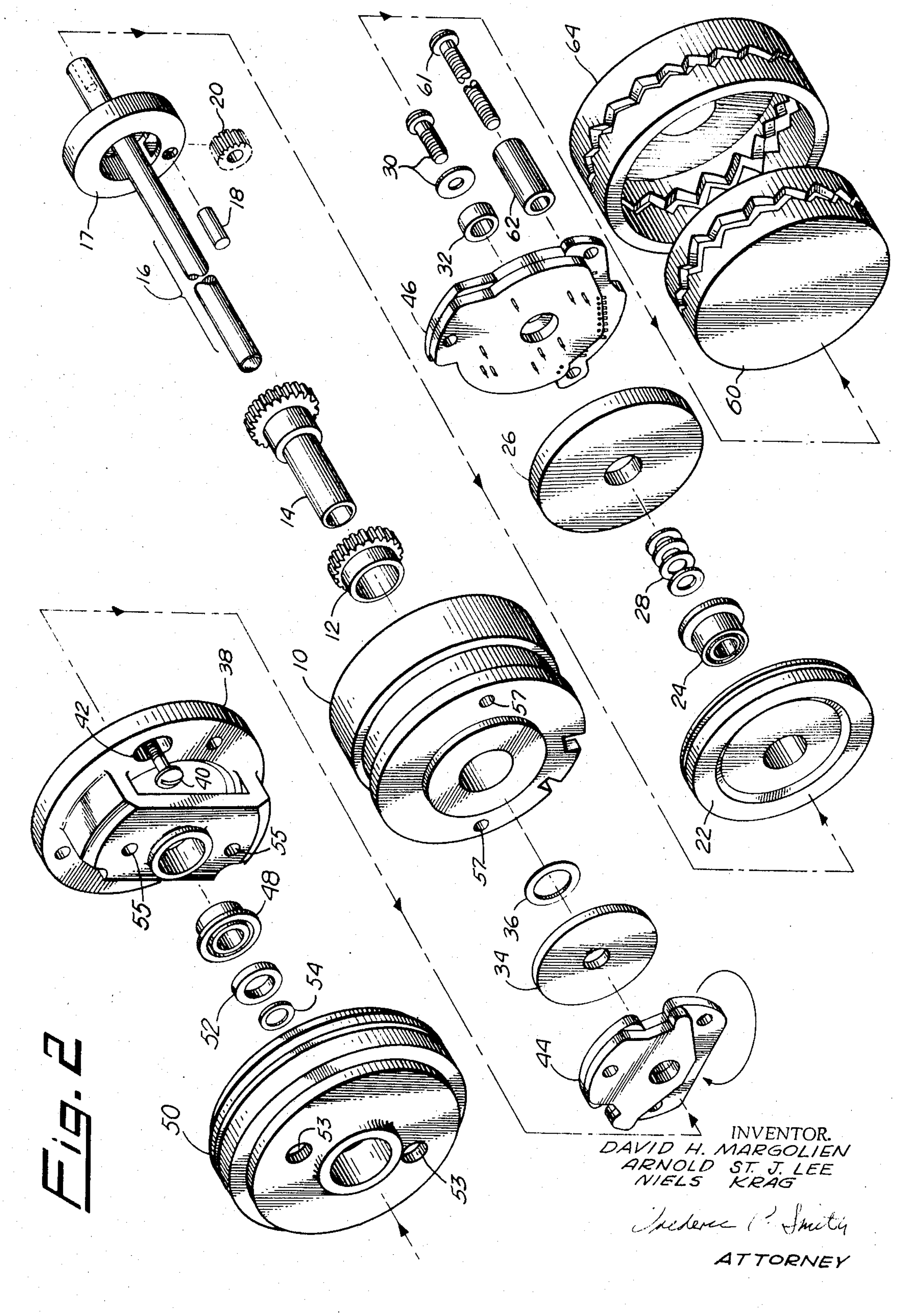

FIG. 1 is a cross-sectional view of a preferred embodiment of the present invention; and FIG. 2 is an exploded, isometric drawing better illustrating the novel features of the present invention.

In FIGURES 1 and 2, a transmission housing 10 is shown having a stationary gear 12 press-fit therein. An input shaft 16 which has integrally attached thereto a cylindrical member 17 and upon which has been placed a movable spur gear 14 (which serves as an output shaft) is inserted through the stationary gear 12. The cylindrical member 17 has a portion thereof removed into which is placed a pinion 20 and a pinion shaft 18. The pinion 20, the movable spur gear 14 and the stationary gear 12 intermesh to form a planetary gear assembly; it should be noted, in contrast to the prior art, that the form of the cylindrical member 17 enables the pinion 20 to be supported at both ends and, in addition, provides a perfectly balanced planetary gear assembly.

The transmission housing 10 then has placed therein a bearing disc 22 into which a ball bearing 24 has been inserted which serves to support the rear end of the input shaft 16. A high speed encoder disc 26 is then press-fit onto the input shaft 16 and axially secures the input shaft 16 from any motion towards the front end of the transmission; the encoder disc 26 thus becomes an integral part of the transmission and performs a double function in the encoder while requiring no additional shaft length for its mounting. The high speed encoder disc 26 is separated from the ball bearings 24 by a series of shims 28 which serve to space the encoder disc 26 a preselected distance from the edge 10′ of the transmission housing 10. The high speed encoder disc 26 is held firmly against the shims 28 and the ball bearings 24 by screw and washer combination 30 and a thrust sleeve 32.

In operation, the high speed encoder disc 26 rotates at the same speed as the input shaft 16. A low speed encoder disc 34 which, will be explained hereinafter, rotates at a speed of $1/32$ as fast as the high speed encoder disc 26 is press-fit onto the movable spur gear 14. The low speed encoder disc 34 is separated from the stationary gear 12 by thrust washer 36 and axially secures the gear 14 (or output shaft) from any motion towards the rear of the encoder transmission. It is thus apparent that the two encoder discs 26 and 34 secure the input and output shafts from motion in the axial direction.

In the present invention, the size reduction of the transmission and the speed reduction of $1/32$ are accomplished through the use of the folded coaxial epicyclic arrangement shown in FIGURES 1 and 2. The input shaft 16 rotates the pinion 20 (having 16 teeth) around the stationary gear 12 (having 33 teeth), the pinion 20 being also intermeshed with the movable spur gear 14 (having 32 teeth). For every revolution of the input shaft 16, the one tooth difference between the stationary gear 12 and the movable spur gear 14 causes the movable spur gear 14 to advance one tooth in relation to the stationary gear 12. Accordingly, for every revolution of the input shaft 16 the movable spur gear 14 moves $1/32$ of a revolution; since the low speed encoder disc 34 rotates with the movable spur gear 14, the speed ratio between the high speed encoder disc 26 and the low speed encoder disc 34 is 32/1.

As shown in FIGURES 1 and 2, a mounting ring 38 is attached to the transmission housing 10 by means of screws 40 inserted in elongated slots 42. A low speed brush block 44 is secured to the mounting ring 38 and is spaced a preselected distance away from the low speed encoder disc 34, such distance being adjusted by the thickness of the thrust washer 36. In similar fashion, high speed brush block 46 is attached to the transmission housing 10 and is spaced a preselected distance away from the high speed encoder disc 26, such distance being adjusted by the number of shims 28. Because of the elongated slots 42 in the mounting ring 38, the mounting ring 38 and, hence, the low speed brush block 44 may be rotationally adjusted with respect to the transmission housing 10 and, hence, the high speed brush block 46. In contrast to the encoder shown in the above-recited patent where the unit had to be disassembled to rotate the brush blocks with respect to one another, in the present invention this is accomplished while the unit is operating by securing the transmission housing 10, loosening the screws 40 and rotating the mounting ring 38 with respect thereto. Thus, means is provided by which the electrical phasing between the output signal from the high speed and low speed brush blocks 46 and 44 can be simply adjusted. Since the input shaft 16 is internally supported by ball bearings 24 and ball bearings 48 (press-fit into the mounting ring 38), the encoder can easily be phase adjusted in such a dynamic condition, i.e., when the input shaft 16 is turning the high speed and low speed encoder discs 26 and 34, without any risk of mechanical damage to the unit. As is well known in the art, this electrical phasing is necessary in order to ensure that the make-break portions of the electrical signals from the high speed brush block 46 and the low speed brush block 44 occur simultaneously. The front end of the transmission assembly is completed by screwing front end cap 50 onto the mounting ring 38 with screws 51 which pass through threaded holes 53 in cap 50 and threaded holes 55 in mounting ring 38 after the input shaft 16 has been further secured by shims 52 and retaining ring 54.

Under operating conditions, output signals from the low speed brush block 44 are conducted via wires 56 to a diode package 60 located in the rear portion of the encoder. The diode package 60, which isolates the output signals from any external voltages, is fastened to the transmission housing 10 by means of screws 61 and held away therefrom by spacers 62. In a like manner, output signals from the high speed brush block 46 are conducted to the diode package 60 by means of wires 58. The rear portion of the encoder is protected by cover 64 which is screwed onto the diode package 60 until firm against the front end cap 50; the cover 64 has a hole 66 in the rear thereof through which output wires 68 can be taken from the diode package 60 to an external device.

Having described the invention, it is apparent that numerous modifications and departures may be made by those skilled in the art; thus, the invention herein described is to be construed as limited only by the spirit and scope of the appended claims.

What is claimed is:

1. A shaft encoder comprising: first and second encoder means; input means for driving said first encoder means; means coupled to said input means for driving said second encoder means; first and second contact means for deriving output signals from said first and second encoder means, respectively; means for adjustably securing said first and second contact means in a preselected rotational position with respect to one another, said adjustably securing means including a housing means and a mounting means, said first and second contact means being mounted to said housing means and said mounting means respectively, and means operable for allowing the rotational adjustment of said contact means while said input means is driving said first and second encoder means.

2. A shaft encoder as claimed in claim 1 wherein said input means comprises an input shaft and including a cylindrical member coaxially mounted thereon at a preselected point; a pinion rotatably mounted in said cylindrical member and having a pinion shaft extending therethrough, said pinion shaft being supported at both ends thereof by said cylindrical member; an output shaft; and means coupling said output shaft and said pinion for driving said output shaft at a preselected rate.

3. The encoder transmission of claim 2 wherein said coupling means comprises a stationary driving gear coaxial with said input shaft and a movable driven gear coaxial with said input shaft, said driving gear and said driven gear being coupled to said pinion.

4. The encoder transmission of claim 3 wherein said input shaft has front and rear portions thereof and said driven gear has a portion thereof extending towards the front portion of said input shaft for forming the output shaft of a folded gear train.

5. A shaft encoder comprising: a rotatable input shaft having front and rear portions thereof; a pinion coupled to said shaft and rotatable therewith; a stationary gear coaxial with said input shaft and coupled to said pinion, said stationary gear causing said pinion to rotate about the center thereof; a movable gear coaxial with said input shaft and coupled to said pinion, said stationary gear and said movable gear having a different number of teeth therein whereby said pinion causes said movable gear to rotate about the axis of said input shaft, said movable gear having a portion thereof extending towards the front portion of said input shaft; first encoder means coupled to the rear portion of said input shaft and rotatable therewith; second encoder means coupled to said movable gear at the portion thereof extending towards the front portion of said input shaft and rotatable with said movable gear; first and second contact means disposed adjacent to and stationary with respect to said first and second encoder means, respectively; and means operable for moving said first and second contact means with respect to one another while said input shaft is rotating.

6. A shaft encoder comprising: an input shaft having front and rear portions thereof; a first encoder disc mounted on the rear portion of said input shaft; a transmission housing means and a mounting means rotatable with respect to one another; a first brush block mounted to the housing means and contacting said first encoder disc; a folded epicyclic gear train coaxial with said input shaft for rotating a second encoder disc at a preselected frequency of rotation, said gear train comprising a stationary driving gear, a movable driven gear, and a pinion coupled to said input shaft, said second encoder disc being mounted on said movable driven gear and rotatable thereby; and a second brush block mounted to the mounting means and contacting said second encoder disc, the angular position of said first and second brush blocks with respect to one another being determined by the angular position of the relatively rotatable housing means and mounting means.

7. The shaft encoder of claim 6 wherein said input shaft has a cylindrical member coaxially mounted thereon for supporting said pinion, said pinion having a pinion shaft extending therethrough and supported at both ends thereof by said cylindrical member.

8. The shaft encoder of claim 6 further comprising means operable for securing said mounting means to said housing means and for allowing rotational adjustment of said mounting means relative said housing means while said input shaft is rotatable.

9. A shaft encoder as claimed in claim 1 wherein said means operable for rotational adjustment includes: elongated slots through said mounting ring; and screw means located within said slots and adapted to engage said housing means for allowing rotational adjustment of said second contact means within the limits provided by said elongated slots.

References Cited

UNITED STATES PATENTS

| | | | |
|---|---|---|---|
| 1,815,419 | 7/1931 | Praetzel | 74—394 |
| 3,054,098 | 9/1962 | Jacoby | 340—347 |
| 3,192,521 | 6/1965 | Sullivan | 340—347 |
| 3,293,637 | 12/1966 | Abbot et al. | 340—347 |

MAYNARD R. WILBUR, *Primary Examiner.*

M. K. WOLENSKY, *Assistant Examiner.*